C. W. JONES.
YIELDING UNIT.
APPLICATION FILED MAR. 28, 1921.

1,435,307. Patented Nov. 14, 1922.

Witnesses

Inventor
Charles William Jones

Patented Nov. 14, 1922.

1,435,307

UNITED STATES PATENT OFFICE.

CHARLES WILLIAM JONES, OF CAMBRIDGE, MASSACHUSETTS.

YIELDING UNIT.

Application filed March 28, 1921. Serial No. 456,293.

*To all whom it may concern:*

Be it known that I, CHARLES WILLIAM JONES, a citizen of the United States, residing at Cambridge, in the county of Middlesex and State of Massachusetts, have invented certain new and useful Improvements in Yielding Units, of which the following is a specification.

This invention relates to improvements in yielding units used to connect two bodies and to hold them in a given relation to each other under a yielding resistance against changing their relative positions, but allowing of variations in their relative positions by a contraction or expansion of the unit against such yielding resistance. It has for its objects to produce a strong, durable and effective device which will obviate the necessity of frequent repairs or inspection, will obtain proper lubrication of its moving parts and to otherwise improve devices of this class as will be more fully understood by the complete description of the same herein contained. The invention is carried out substantially as illustrated on the accompanying drawings and set forth in the claims annexed hereto which form an essential part of this specification.

On the drawings like characters of reference refer to like parts wherever they occur on the different parts of the drawings.

Figure 1:
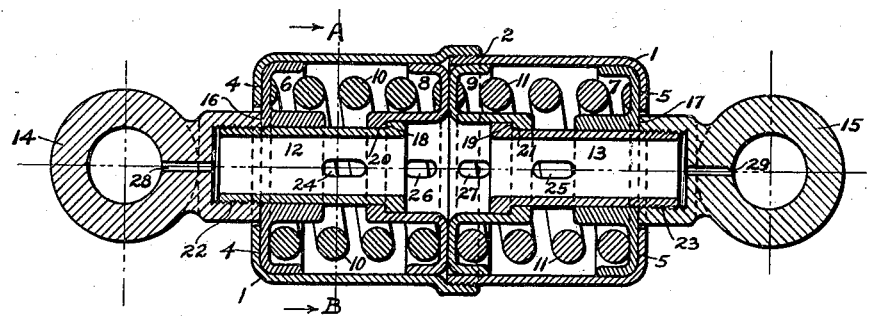
Fig. 1 represents a longitudinal section of a yielding unit, made in accordance with my invention showing the parts in their normal position and ready to be attached between the two bodies to act as a yielding connection between the bodies.
Figure 2:
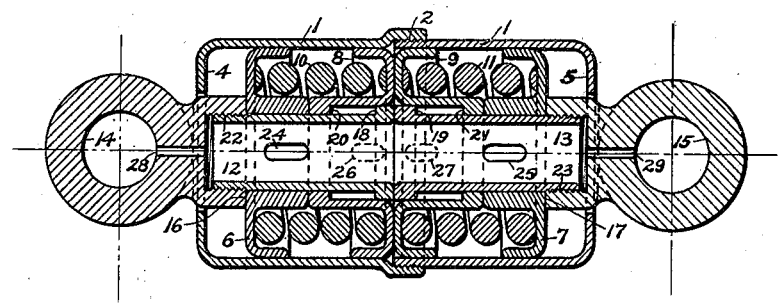
Fig. 2 represents a similar view of a yielding unit, showing the various parts thereof in the positions which they occupy when the yielding unit has been contracted to the limit of its contraction and the bodies connected thereby are in their closest relative positions.
Figure 3:
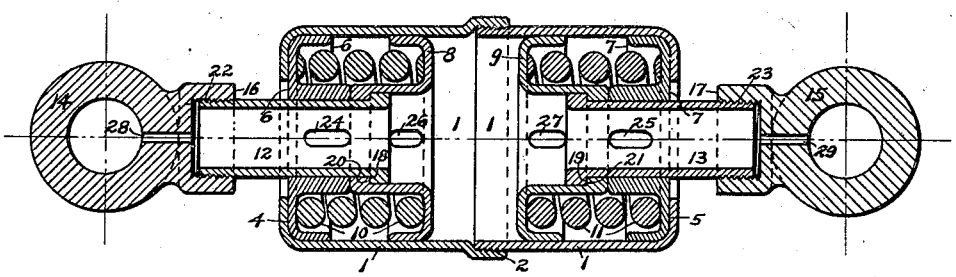
Fig. 3 represents a similar view of a yielding unit, showing the various parts thereof in the positions which they occupy when the yielding unit has been expanded to the limit of its expansion and the bodies connected thereby have been moved apart to the greatest distance relative to each other.
Figures 4, 5:
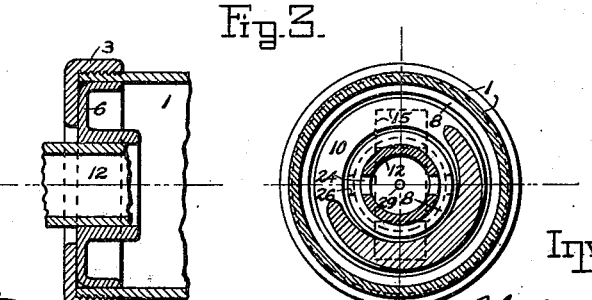
Fig. 4 represents a cross section of the yielding unit on the line A—B shown in Fig. 1.
Fig. 5 represents a detailed sectional view of a portion of the enclosing casing of the yielding unit, showing a modified manner of closing the casing and forming essential parts thereof.

The outer casing 1 of the yielding unit is made tubular, substantially as shown, having its ends made integral with the tubular portion thereof, and having its parts joined together, approximately midway its ends, by the joint 2 which may be welded, or screwthreaded substantially as shown in Figs. 1, 2 and 3, or said casing may be made from tubing and its ends made in the form of a cap 3 welded to said tubing, or screw-threaded together as shown in Fig. 5.

The ends of the casing are perforated at the center and form internal shoulders 4 and 5 therein for a purpose to be understood by a further description of the device.

At each end of the casing, within the same, is placed the respective bearing members 6 and 7, which may be moved longitudinally within the casing. Within the casing is also placed a second pair of bearing members 8 and 9 arranged intermediate the pair of bearing members 6 and 7, which also may be moved longitudinally within the casing. These bearing members form seats for the yielding mediums 10 and 11 used in the unit; the yielding medium 10 being placed between the bearing members 6 and 8, and the yielding medium 11 being located between the bearing members 7 and 9. The yielding mediums 10 and 11, have been shown on the drawings as consisting of open wound helical springs, but may be made from blocks of rubber or any other suitable yielding or resilient material. The bearing members are preferably formed with sleevelike extension upon which the yielding mediums are mounted and by which they are properly guided and supported during their movements caused by the action of the yielding medium.

The bearing members are preferably of such a size as to form an easy running fit within the casing and also of such a length as to insure of a proper alignment of such bearing members with a fairly tight joint between the surface of the bearing members and interior of the casing, for a purpose to be fully understood by the further description of the device.

The yielding mediums 10 and 11 may be made with any degree of initial resistance against compression, as and for a purpose to be described hereinafter, but they are preferably of such a length as to hold the bearing members 6 and 7 against the shoulders 4 and 5 on the ends of the casing and the intermediate bearing members 8 and 9, on the sleeve projections thereon, against each other with the desired amount of yielding resistance and so that it will be impossible to move any one or more of the bearing members longitudinally within the casing without increasing the yielding resistance on said member against such a movement.

If it is desired to increase the amount of movement of the bearing members from their normal relative positions shown in Fig. 1 before a desired increase of the yielding resistance is obtained and then make the yielding unit more sensitive, I can make the yielding mediums more sensitive to compression, and so as to necessitate the compression of such mediums to the desired amount of initial resistance in the unit, before such yielding mediums are of proper length to be inserted within the casing and hold the parts of the unit in their normal position shown in Fig. 1 with the desired amount of yielding resistance.

From the description thus far obtained, it will be seen that it is impossible for the yielding mediums to expand beyond their normal positions shown in Fig. 1 but that such mediums are free to be compressed, more or less, by the movements of the bearing members 6 and 7 toward each other, or by the movements of the bearing members 8 and 9 away from each other.

In order to connect the yielding unit to the bodies, between which it is to form a yielding connection, I provide the yielding unit with the sliding members 12 and 13, which sliding members are inserted through the perforated ends of the casing and slidably mount the bearing members 6 and 8 with the intermediate yielding medium 10 upon the sliding member 12; I also slidably mount the bearing members 7 and 9 with their intermediate yielding medium 11 upon the sliding member 13. It will thus be seen that the bearing members are capable of sliding longitudinally upon the sliding member upon which they are mounted and that the sliding members are capable of sliding longitudinally in relation to the bearing members mounted thereon.

The sliding members are preferably made cylindrical and tubular, substantially as shown, and are provided with suitable means, as the respective eye-pieces 14 and 15 by which the yielding unit may be connected to the bodies between which the yielding unit is to form a yielding connection, but any other common and well known means of connection between the unit and body may be used in lieu thereof.

The sliding member 12 is provided with external shoulders 16 and 18 and, when in its normal position, as shown in Fig. 1, its shoulder 16 rests against the outer surface of the bearing member 6, and its shoulder 18 rests against a shoulder 20 on the interior of the bearing member 8. In a similar manner the sliding member 13 is provided with external shoulders 17 and 19 and, when in its normal position, as shown in Fig. 1, its shoulder 17 rests against the outer surface of the bearing member 7, and its shoulder 19 rests against a shoulder 21 on the interior of the bearing member 9.

It will be understood that any movement of the sliding members, towards each other from their normal positions shown in Fig. 1, to or towards their positions shown in Fig. 2, will cause the shoulder 16 on the sliding member 12 and the shoulder 17 on the sliding member 13 to move towards each other and, as the bearing members 8 and 9 are in engagement with each other, and also, as the shoulders 16 and 17 are in engagement with the bearing members 6 and 7, this movement of the sliding members will cause the bearing members 6 and 7 to move towards each other compressing the yielding mediums, thus opposing this movement with an increasing yielding resistance due to such compression of the yielding mediums. It will also be seen that any movement of the sliding members from each other, or from their normal positions shown in Fig. 1, to or towards their positions shown in Fig. 3, will cause the shoulder 18 on the sliding member 12, and the shoulder 19 on the sliding member 13 to move away from each other and, as these shoulders are in engagement with the respective inner shoulders 20 and 21 on the respective bearing members 8 and 9 and, as the bearing members 6 and 8 are in engagement, or rest against, the interior of the ends of the casing or against the shoulders 4 and 5 thereon, this movement of the sliding members 12 and 13 will move the bearing members 8 and 9 from engagement with each other with an increasing yielding resistance due to the increasing compression of the yielding mediums 10 and 11.

From the construction and arrangement thus far described, it will be seen that any two bodies connected to the opposite ends of the yielding unit may be held from movements in either direction from their normal relative positions, by any desired amount of yielding resistance, due to the construction or initial resistance of the yielding mediums to compression or to the amount of compression of the yielding mediums when the unit is in its normal condition as shown in Fig. 1; also that any movement of the connected bodies from their normal relative positions, either towards or from each other, will cause an increasing but yielding resistance within the unit to such movements, due to the further compression of the yielding mediums therein. As the strength and endurance or life of a yielding medium, especially of a coil or helical spring, is increased by submitting such mediums to stress in one direction only, it will be seen that I have accomplished this result by my construction of the unit above described.

When the unit is contracted from its normal position, shown in Fig. 1, to or towards the position shown in Fig. 2, there would be great danger of its bending or buckling if it were not made of such a construction as to resist this tendency, but I believe that I have overcome such a defect by the tubular construction of the outer casing and by having the bearing members of such dimensions as to practically fit within the interior bore of the casing. By making most of the parts of the unit tubular, I am able to obtain great strength with a minimum of weight of the unit, also obtain circular bearings which tend to retain the parts in proper alignment at all times and by enclosing the parts within a circular casing dust and dirt are excluded therefrom.

The unit is easily assembled and by the use of a very few joints, and, as there is practically nothing in the unit which is liable to break or to get out of order, such joints as are necessary in assembling the unit may be made permanent or as welded joints.

If it should be found necessary to provide means whereby the amount of the normal yielding resistance to compression of the yielding mediums could be increased or diminished after the unit had been assembled, I attach the eye-pieces 14 and 15 to the sliding members 12 and 13 by the respective adjustable screw-threaded joints 22 and 23 which may be made permanent, either by welding or other means, after the proper adjustment of the yielding resistance has been obtained.

It is desirable that the unit should be provided with some means of lubrication in order to prevent wear and noise during its operation and to increase its sensitiveness or ease of operation. In order to accomplish this result, I introduce a quantity of flake or powdered graphite or other suitable lubricant within the casing and provide the sliding members with suitable perforations 24 and 25 forming communication between the interior of the casing and the interior of the sliding members. I also provide the bearing members 8 and 9 with the perforations 26 and 27 for the same purpose. By this means I am able to circulate the lubricant within the casing and thus supply a quantity of such lubricant to all the moving parts and surfaces liable to wear or to create friction within the casing. I am also able by such perforations to allow of a free circulation of air within the casing which air acts to cause the circulation of graphite or other lubricant. In order to provide lubrication to the bearing surfaces of the eye-pieces 14 and 15 I may provide such eye-pieces with the respective perforations 28 and 29 which form communication between the interior of the casing and such bearing surfaces so as to allow the supply of lubricant to said surfaces. This, my improved yielding unit is applicable to many devices in which it is desired to connect two bodies with a yielding connection, which will hold the bodies in a given relation to each other with a yielding resistance, but which will still allow of variations in such relative positions of the bodies, to or from each other, with an increasing of this yielding resistance. The yielding units may be used singly or in one or more series as desired or found necessary.

I will simply mention some of the devices in which the unit may be used to advantage, such as in shock-absorbers upon vehicles or elsewhere, in devices by which vehicles are drawn or pushed; in resilient wheels used either to support a load or to convey power from a driving body to a driven body, whether such movement is rotary, reciprocating or oscillating.

Having thus fully described the construction, operation and some of the uses of my invention I claim:

1. In a yielding unit capable of expansion and contraction under yielding resistance, oppositely disposed sliding members, bearing members engaged and moved towards each by the sliding members when moved in one direction, bearing members engaged and moved from each other by the sliding members when moved in the opposite direction, a yielding medium on each sliding member between each pair of oppositely disposed bearing members thereon, and an enclosing casing limiting the movements of the bearing members, whereby the yielding mediums are compressed independent of the direction of the movements of the sliding members.

2. In a yielding unit capable of expansion and contraction under yielding resistance; oppositely disposed sliding members; oppositely disposed bearing members, one on each sliding member, moved away from each other by the movements of the sliding members in one direction, but limited in movement towards each other by engagement one with the other; a yielding medium on each sliding member, engaged by the bearing member thereon; oppositely disposed bearing members, one on each sliding member, engaging the yielding medium thereon, and moved towards each other by a movement of the sliding members in opposition to their first mentioned movements; and an enclosing casing surrounding the bearing members and yielding mediums on the sliding members and limiting the movements of the latter bearing members from each other.

3. In a unit expanding and contracting under a yielding resistance; a casing, perforated and provided with inwardly projecting shoulders at each end thereof; a pair of bearing members within the casing one at each end engaging the shoulders therein; a second pair of bearing members within the casing intermediate the first mentioned bearing members, engaging each other, each of the bearing members movable longitudinally in relation to the casing independent of each other, two yielding mediums within the casing arranged between the bearing members, each yielding medium engaged by one of the bearing members of each pair of bearing members; two sliding members, each inserted through a perforation in the casing and through one of the bearing members of each pair of the enclosed bearing members; and means on each sliding member whereby the bearing members are moved to compress the yielding medium thereon by the movements of the sliding members in either direction.

4. In a unit expanding and contracting under a yielding resistance; a casing, perforated and provided with inwardly projecting shoulders at each end thereof; a pair of bearing members within the casing one at each end engaging the shoulders therein; a second pair of bearing members within the casing intermediate the first mentioned bearing members, engaging each other, each of the bearing members movable longitudinally in relation to the casing independent of each other, two yielding mediums within the casing arranged between the bearing members, each yielding medium engaged by one of the bearing members of each pair of bearing members; two sliding members, each inserted through a perforation in the casing and through one of the bearing members of each pair of the enclosed bearing members; and shoulders on each sliding member engaging the bearing members thereon on opposite sides of the bearing members by a longitudinal movement of the sliding members, whereby the yielding mediums are compressed independent of the direction in which the sliding members are moved in relation to each other.

5. In a yielding unit expanding or contracting under a yielding resistance, a casing, sliding members entering said casing, bearing members and yielding mediums within said casing arranged substantially as described, and a shoulder on each of the sliding members engaging the bearing members compressing the yielding medium by a movement of the sliding members in either direction, each shoulder adjustable on its sliding member to vary the normal amount of yielding resistance in the unit.

6. In a yielding unit expanding and contracting under a yielding resistance, a tubular casing, tubular sliding members entering said casing, bearing members and yielding mediums within the casing moved longitudinally therein by the sliding movements of the sliding members in relation to each other to vary the yielding resistance in the yielding unit, said casing, sliding members, and bearing members, forming a substantially tight enclosing casing for the yielding mediums, and perforations through the sliding members and bearing members for the circulation of air and lubricating material within the casing.

CHARLES WILLIAM JONES.